(12) United States Patent
Sugio (10) Patent No.: US 11,796,435 B2
(45) Date of Patent: Oct. 24, 2023

(54) MOLD COATING AGENT TEST DEVICE HAVING FRAME POSITIONING PORTION THAT POSITIONS FRAME PORTION OF METAL MOLD

(71) Applicant: TOYOTA JIDOSHA KABUSHIKI KAISHA, Toyota (JP)

(72) Inventor: Keisuke Sugio, Chiryu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 3 days.

(21) Appl. No.: 17/581,058

(22) Filed: Jan. 21, 2022

(65) Prior Publication Data

US 2022/0291104 A1    Sep. 15, 2022

(30) Foreign Application Priority Data

Mar. 11, 2021    (JP) ................ 2021-039099

(51) Int. Cl.
| | | |
|---|---|---|
| *G01N 3/02* | (2006.01) | |
| *G01N 3/24* | (2006.01) | |
| *G01N 9/04* | (2006.01) | |
| *G01N 3/56* | (2006.01) | |
| *G01N 1/36* | (2006.01) | |

(52) U.S. Cl.
CPC ............. *G01N 3/56* (2013.01); *G01N 1/36* (2013.01); *G01N 3/02* (2013.01); *G01N 3/24* (2013.01); *G01N 2001/366* (2013.01); *G01N 2203/0206* (2013.01); *G01N 2203/0262* (2013.01); *G01N 2203/0447* (2013.01)

(58) Field of Classification Search
CPC .. G01N 3/56; G01N 1/36; G01N 3/02; G01N 3/24; G01N 2001/366; G01N 2203/0206; G01N 2203/0262; G01N 2203/0447; G01N 19/00; G01N 3/08; H01R 4/72; B22D 17/00; B29C 45/14008; B29C 2049/47; B29C 45/33; B29D 23/00; B21D 7/06; G01L 5/0038; B22C 23/02
See application file for complete search history.

(56) References Cited

U.S. PATENT DOCUMENTS

| | | | |
|---|---|---|---|
| 2020/0269313 A1* | 8/2020 | Kaneda | .................. B22D 46/00 |
| 2021/0268579 A1* | 9/2021 | Ogyu | ........................ B22C 9/06 |

FOREIGN PATENT DOCUMENTS

| | | |
|---|---|---|
| JP | 2005-9971 A | 1/2005 |
| JP | 2011-64570 A | 3/2011 |
| JP | 2017-58144 A | 3/2017 |
| JP | 2020-122987 A | 8/2020 |

* cited by examiner

*Primary Examiner* — Brandi N Hopkins
(74) *Attorney, Agent, or Firm* — Oblon, McClelland, Maier & Neustadt, L.L.P.

(57) ABSTRACT

A mold coating agent test device includes a frame positioning portion and a connection positioning portion. The frame positioning portion positions a frame portion of a metal mold such that the frame portion of the metal mold is positioned at a predetermined position when the metal mold is placed on a metal block. The connection positioning portion positions a connecting portion such that the connecting portion that is a portion provided in the frame portion and to which a drive unit that applies a force is connected is positioned at a predetermined position when the metal mold is placed on the metal block.

6 Claims, 10 Drawing Sheets

MOLD COATING AGENT TEST DEVICE HAVING FRAME POSITIONING PORTION THAT POSITIONS FRAME PORTION OF METAL MOLD

CROSS-REFERENCE TO RELATED APPLICATION

This application claims priority to Japanese Patent Application No. 2021-039099 filed on Mar. 11, 2021, incorporated herein by reference in its entirety.

BACKGROUND

1. Technical Field

The present disclosure relates to a mold coating agent test device.

2. Description of Related Art

Generally, in a die casting method, a mold coating agent is applied in advance to the inner face of a mold in order to reduce baking of the mold by a molten metal and to facilitate separation of a molded product from the mold. A test method for examining performance of adhesion and strength of the mold coating agent is known. For example, in the method described in Japanese Unexamined Patent Application Publication No. 2005-9971 (JP 2005-9971 A), a casting is molded by applying a mold coating agent to a metal block having a plate shape (hereinafter referred to as a "plate-shaped block"), placing a metal block having a tubular shape (hereinafter referred to as a "tubular block") on the plate-shaped block such that the plate-shaped block closes the lower end portion of the tubular block, and pouring a molten metal into the tubular block to be solidified. After that, a pulling force or a pushing force is applied to the tubular block, and the performance of the mold coating agent is evaluated based on a load applied to the tubular block and a surface condition of the plate-shaped block after removing the tubular block and the casting.

SUMMARY

In the performance evaluation of the mold coating agent as described above, it is desirable that a position and a direction in which a force is applied to the tubular block are a predetermined position and a predetermined direction in order to perform an accurate evaluation. However, in the method described in JP 2005-9971 A, there is an issue that the position and the direction in which the force is applied to the tubular block depends on the skill level of an operator, and particularly when a test is repeated a plurality of times for evaluation, evaluation accuracy becomes low.

The present disclosure can be realized in the following aspects.

(1) According to one aspect of the present disclosure, a mold coating agent test device is provided. The mold coating agent test device tests a performance of a mold coating agent by applying the mold coating agent to a surface of a metal block, placing a metal mold having a tubular shape on the metal block such that the metal block closes one end portion of the metal mold, and applying a pulling force or a pushing force to the metal mold such that the metal mold is separated from the metal block after a molten metal is poured into the metal mold and solidified. The mold coating agent test device includes a frame positioning portion that positions a frame portion of the metal mold such that the frame portion is positioned at a predetermined position when the metal mold is placed on the metal block, and a connection positioning portion that positions a connecting portion such that the connecting portion that is a portion provided in the frame portion and to which a drive unit that applies the force is connected is positioned at a predetermined position when the metal mold is placed on the metal block. The mold coating agent test device according to the above aspect includes the frame positioning portion and the connection positioning portion, and is arranged in which the entire metal mold can be set on the metal block such that both the frame portion and the connecting portion are disposed at the predetermined positions on the metal block. As a result, especially when a test is repeated a plurality of times for evaluation, and a pulling force or a pushing force is applied to the metal mold, a position and a direction in which the force is applied can be set to be accurate and approximately constant without depending on a skill level of an operator, so that the possibility of measurement errors can be suppressed and evaluation accuracy can be improved.

(2) In the above aspect, the frame positioning portion may include a frame contact portion that is in contact with a part of an entire circumference of an outer peripheral surface of the frame portion from an outside of the frame portion and that has a shape that extends along a shape of the frame portion. According to the aspect, since the frame contact portion has a shape that extends along the shape of the frame portion, the frame contact portion contacts at least a part of the entire circumference of the outer peripheral surface of the frame portion from the outside of the frame portion, so that the frame portion can be easily positioned at an installation position.

(3) In the above aspect, the connecting portion may be provided so as to project from an outer peripheral surface of the frame portion. The connection positioning portion may include a connection contact portion that restricts a relative rotation of the frame portion with respect to the metal block with the connection contact portion contacting the connecting portion. According to the aspect, the relative rotation of the frame portion with respect to the metal block is restricted by the connection contact portion contacting the connecting portion in a circumferential direction. Therefore, the connecting portion can be easily positioned at the installation position.

(4) In the above aspect, the frame positioning portion and the connection positioning portion may be included in a mold positioning member. According to the aspect, the configuration of the mold coating agent can be simplified and the mold coating agent can be downsized as compared with a case in which the frame positioning portion and the connection positioning portion are composed as separate members.

(5) In the above aspect, a movement mechanism unit that allows the mold positioning member to move with respect to the metal block may be further provided. According to the aspect, the mold positioning member can be moved closer to or farther from the surface of the metal block, so that workability can be improved. For example, when a force is applied to the metal mold, the mold positioning member is positioned away from the metal block, so that interference with the drive unit can be suppressed.

(6) In the above aspect, a movement restricting unit that faces the surface of the metal block and restricts movement of the metal block toward the metal mold may be further provided. According to the aspect, the movement restricting unit restricts the movement of the metal block toward the metal mold. Therefore, when the force is applied to the metal mold by the drive unit, it is possible to reduce a possibility that the metal block moves and tilts toward the metal mold, so that an accurate test can be performed.

BRIEF DESCRIPTION OF THE DRAWINGS

Features, advantages, and technical and industrial significance of exemplary embodiments will be described below with reference to the accompanying drawings, in which like signs denote like elements, and wherein.

DETAILED DESCRIPTION OF EMBODIMENTS

A. Embodiment

A1. Configuration of Mold Coating Agent Test Device 101

A mold coating agent test device 101 according to a first embodiment of the present disclosure will be described with reference to FIGS. 1 to 15. In a die casting method, a mold coating agent (also called a mold release agent or a lubricant) is applied in advance to the inner face of a mold in order to reduce baking of the mold by a molten metal and to facilitate separation of a molded product from the mold. The mold coating agent test device 101 according to the first embodiment is used for a test for examining the performance of the mold coating agent, such as adhesion of the mold coating agent to the mold and strength thereof when the mold is repeatedly used and whether the mold has an appropriate mold release resistance (hereinafter also simply referred to as a "performance test"). The mold release resistance is a force that causes the molded casting (hereinafter referred to as a molded product) to adhere to and keep adhering to the mold, and the smaller the mold release resistance is, the easier it is to release the molded product. It is necessary to understand how much force the mold release resistance exerts in order to stably remove the molded product from the mold.

First, the outline of the performance test according to the first embodiment and the metal block to be used in the test will be briefly described. In the performance test according to the first embodiment, the performance of the mold coating agent is tested by applying a mold coating agent to be tested to the surface of a plate-shaped block 40, placing a tubular block 50 (see FIG. 5) on the plate-shaped block 40 such that the plate-shaped block 40 closes one end portion of the tubular block 50, pouring a molten metal into the tubular block 50 to be solidified, and applying a pulling force or a pushing force to the tubular block 50. A detailed motion of the mold coating agent test device 101 will be described below together with the detailed procedure for the performance test.

This performance test is performed in a state where the tubular block 50 is placed at a predetermined position on the plate-shaped block 40 (hereinafter, also referred to as an "installation position"). The plate-shaped block 40 is a flat plate made of a metal material and corresponds to a "metal block". The tubular block 50 is a cylindrical body made of a metal material and corresponds to a "metal mold".

Figure 14:
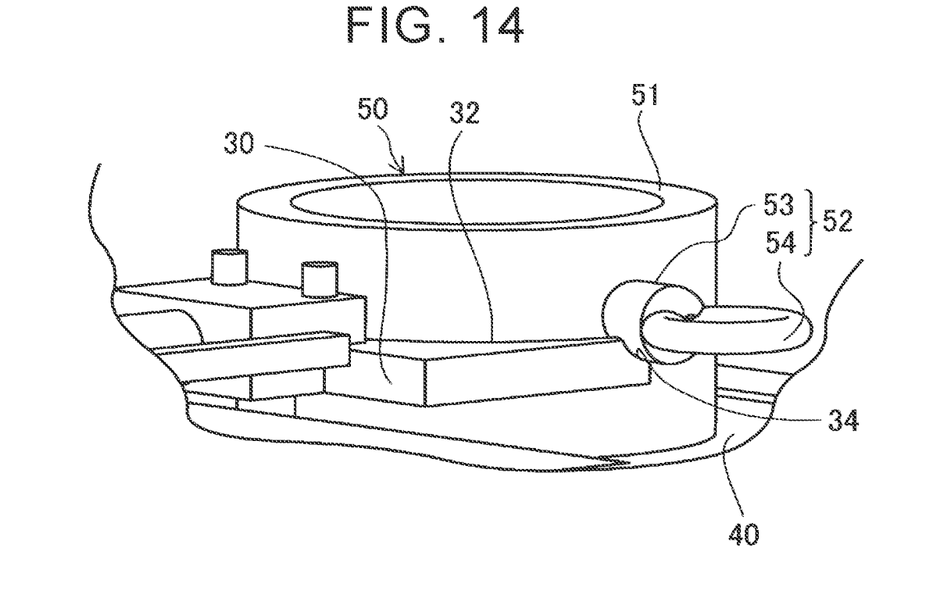
FIG. 14 is a perspective view showing a periphery of a connecting portion in a state in where the tubular block is positioned by a tubular block positioning member.

A configuration of the tubular block 50 will be briefly described with reference to FIG. 14. FIG. 14 is a perspective view schematically showing a periphery of a connecting portion 52 in a state where the tubular block 50 is positioned on the plate-shaped block 40 by positioning member 30. As shown in FIG. 14, the tubular block 50 includes a frame portion 51 having a cylindrical shape and the connecting portion 52. The connecting portion 52 radially projects outward from the outer circumference of the frame portion 51 and is provided integrally with the frame portion 51. The connecting portion 52 is composed of a columnar portion 53 and an annular hook portion 54. The columnar portion 53 is provided so as to radially project outward from the frame portion 51 in a direction in which an axial direction thereof coincides with a radial direction of the frame portion 51. The annular hook portion 54 further radially projects outward from the columnar portion 53.

Figure 1:
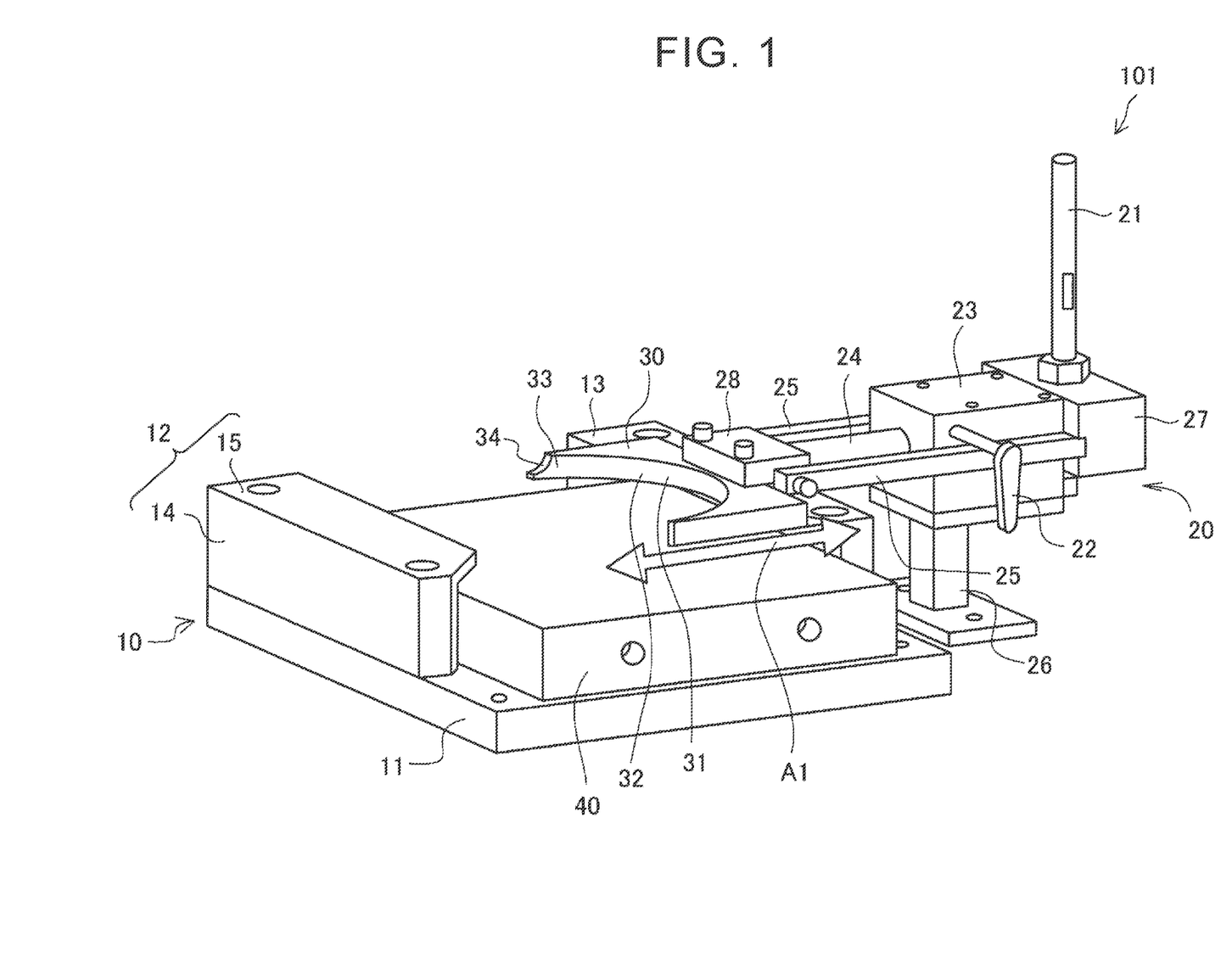
FIG. 1 is a perspective view showing a schematic configuration of a mold coating agent test device according to a first embodiment of the present disclosure.
Figure 2:
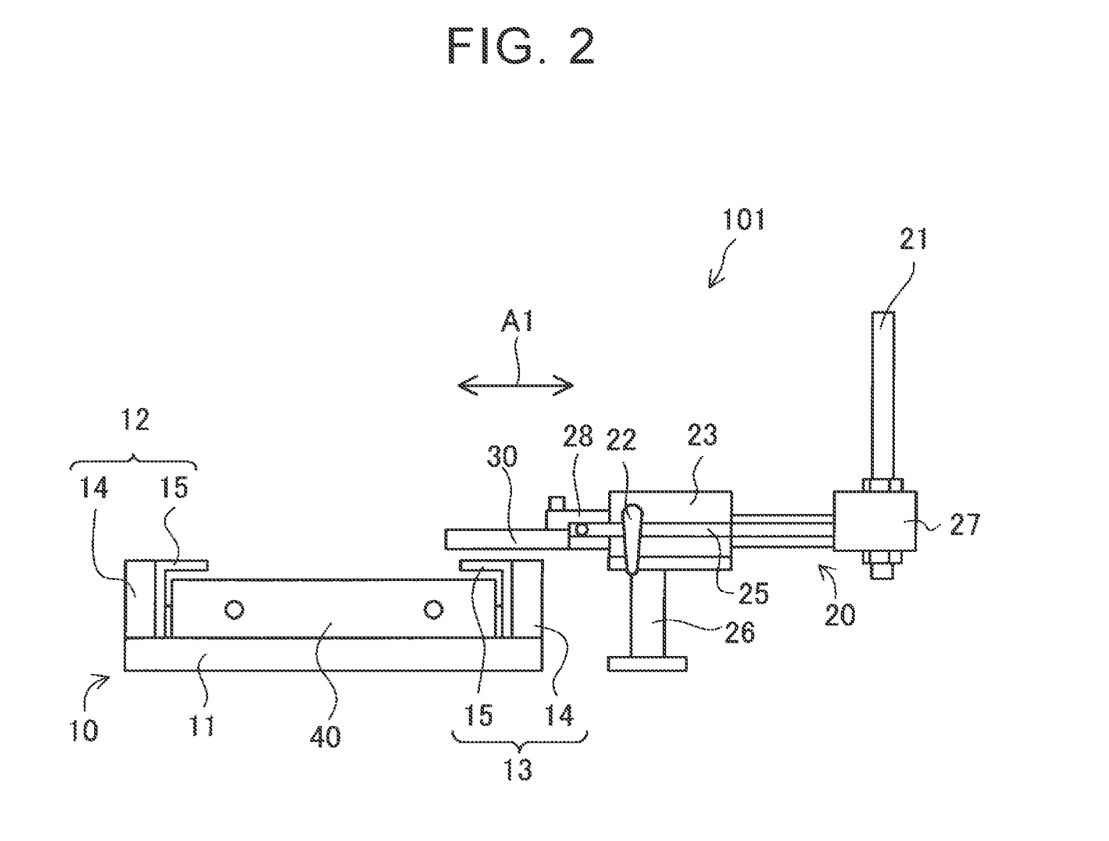
FIG. 2 is a side view showing a schematic configuration of the mold coating agent test device according to the first embodiment of the present disclosure.

FIG. 1 is a perspective view showing a schematic configuration of the mold coating agent test device 101 according to the first embodiment of the present disclosure. FIG. 2 is a side view showing a schematic configuration of the mold coating agent test device 101 according to the first embodiment of the present disclosure, and shows a state where the positioning member 30 to be described below is located at an initial position (retracted position) that is a predetermined position. In FIGS. 1 and 2, the plate-shaped block 40 to be placed on the mold coating agent test device 101 at the time of the test is also shown.

As shown in FIGS. 1 and 2, the mold coating agent test device 101 includes a plate-shaped block set unit 10 and a tubular block positioning mechanism unit 20. Hereinafter, a forward direction of an operation handle 21 and the tubular block positioning member 30 that is a left direction in FIG. 2 and will be described below is referred to as "front", and a rearward direction of the operation handle 21 and the tubular block positioning member 30 that is a right direction in FIG. 2 is referred to as "rear". Further, a direction orthogonal to a front-rear direction is a right-left direction, and in FIG. 2, a further side to a viewer of the drawing is "right" and a closer side to the viewer of the drawing is "left".

The plate-shaped block set unit 10 includes a base plate 11 and two locking portions 12 and 13. The base plate 11 is a rectangular parallelepiped plate-shaped member. The front locking portion 12 is provided at the front end portion of the base plate 11. The rear locking portion 13 is provided at the rear end portion of the base plate 11. The locking portions 12 and 13 have the same shapes and are provided so as to face each other in the front-rear direction. Each of the locking portions 12 and 13 is composed of an upright portion 14 and a horizontal portion 15 each having a plate shape, and has an L shape in the side view. The upright portion 14 is fixed to the base plate 11 and stands vertically from the base plate 11. The horizontal portion 15 is connected to the upper end of the upright portion 14 and is provided so as to extend in a horizontal direction. The horizontal portion 15 of the front locking portion 12 is provided so as to extend rearward. The horizontal portion 15 of the rear locking portion 13 is provided so as to extend forward.

The height from the upper face of the base plate 11 to the lower face of each horizontal portion 15 is slightly higher than the thickness of the plate-shaped block 40 such that the plate-shaped block 40 can be inserted between the upper face of the base plate 11 and the lower face of each horizontal portion 15. The two locking portions 12 and 13 restrict upward movement of the plate-shaped block 40. That is, the locking portions 12 and 13 function to suppress the upward lifting of the plate-shaped block 40. The locking portions 12 and 13 correspond to "movement restricting units".

The tubular block positioning mechanism unit 20 includes the operation handle 21, a lock handle 22, a linear bush 23, a linear shaft 24, two side rails 25, and the tubular block positioning member 30 for positioning the tubular block.

The linear bush 23 has a rectangular parallelepiped shape and is provided at a predetermined height by a leg 26. The linear bush 23 uses a built-in ball bearing (not shown) to guide a linear motion portion of the linear shaft 24 by rolling. A well-known linear guide mechanism is configured by the linear shaft 24 and the linear bush 23. The linear shaft 24 is capable of linear motion in the front-rear direction that is the horizontal direction. The linear shaft 24 and the linear bush 23 correspond to "movement mechanism units".

The operation handle 21 is connected to the rear end of the linear shaft 24 via a connecting member 27. The operation handle 21 is a rod-shaped member, and stands vertically upward from the connecting member 27. An operator grasps the operation handle 21 and operates the operation handle 21 in the front-rear direction such that the linear shaft 24 and the positioning member 30 can advance and retract in the horizontal direction.

The lock handle 22 is a handle for locking and unlocking the linear motion of the linear shaft 24 in the front-rear direction. The lock handle 22 is a screw that constitutes a well-known screw mount lock mechanism provided in the linear bush 23. By tightening the lock handle 22 as a screw, the motion of the linear shaft 24 is locked by sandwiching the linear shaft 24 between the side face in the mount (not shown) provided in the linear bush 23 and the end surface of the lock handle 22. That is, by tightening the lock handle 22, the linear shaft 24 is in a locked state in which linear motion is impossible, and by loosening the lock handle 22, the linear shaft 24 is in an unlocked state in which linear motion is possible.

The positioning member 30 is integrally provided at the front end of the linear shaft 24 via a fixing member 28. The positioning member 30 is a plate-shaped member. At the front end of the positioning member 30, a recess 31 having a semicircular shape in a plan view is provided so as to be cut out from the front end to the rear side of the plate-shaped member at substantially the middle in the right-left direction. An inner peripheral surface 32 of the recess 31 has a shape that extends along the outer peripheral shape of the frame portion 51 of the tubular block 50 so as to be able to contact substantially half of the entire circumference of the outer peripheral surface of the frame portion 51 from the outside of the frame portion 51 (See FIG. 5). The inner peripheral surface 32 of the recess 31 corresponds to a "frame contact portion" that positions the frame portion 51 such that the frame portion 51 of the tubular block 50 is disposed at a predetermined position.

A front right end portion 33 of the positioning member 30 includes a curved surface 34 that is gently curved in an up-down direction and has an approximately quarter circular shape in the side view. This curved surface shape is a shape that extends along a part of the outer peripheral surface of the connecting portion 52 (columnar portion 53) of the tubular block 50 (see FIG. 14). With the curved surface 34 contacting the connecting portion 52 in a circumferential direction, relative rotation of the frame portion 51 with respect to the plate-shaped block 40 is restricted. The curved surface 34 corresponds to a "connection contact portion" that positions the connecting portion 52 such that the connecting portion 52 is disposed at a predetermined position. The positioning member 30 corresponds to a "mold positioning member", a "frame positioning portion", and a "connection positioning portion".

Each side rail 25 is disposed on the right and left sides of the linear shaft 24 and is provided so as to extend in the front-rear direction. The front end of each side rail 25 is connected to the rear end of the positioning member 30, and the rear end of each side rail 25 is connected to the connecting member 27. Each side rail 25 is a so called a reinforcing member, and reinforces the positioning member 30 having a plate shape, such that the plate shaped positioning member 30 is maintained horizontally and stably.

A2. Test Procedure Using Mold Coating Agent Test Device 101

Figure 3:
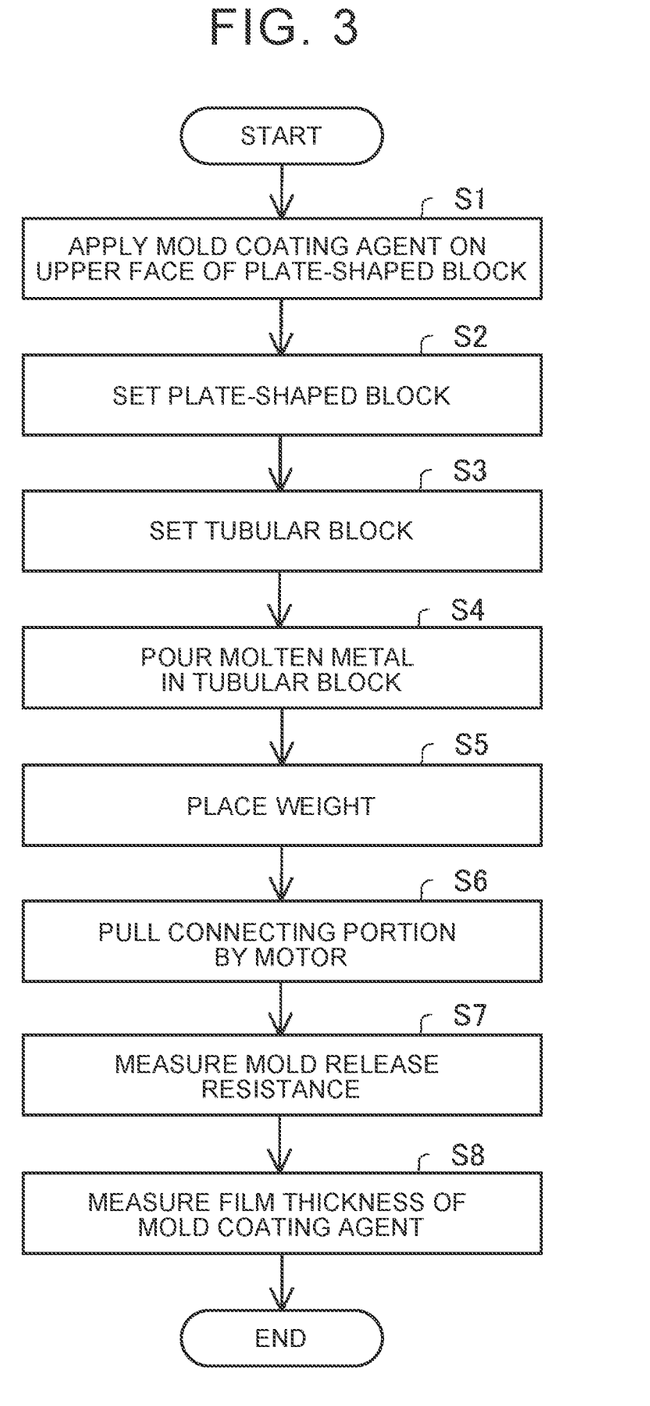
FIG. 3 is a flowchart showing a performance test procedure for the mold coating agent.

Next, a test procedure for the mold coating agent using the mold coating agent test device 101 will be described with reference to FIGS. 3 to 8. FIG. 3 is a flowchart showing a performance test procedure for the mold coating agent. FIGS. 4 to 8 are each a schematic diagram for illustrating each step of the performance test procedure for the mold coating agent. As shown in FIG. 3, first, a die-cast mold coating agent diluted to a predetermined concentration is applied to the upper face of the plate-shaped block 40 by a predetermined coating method (step S1). Examples of the die-cast mold coating agent include a liquid mold release agent to be mainly used in a high pressure die casting and a non-liquid mold coating agent to be mainly used in a low pressure die casting and to be obtained by agitating water, aggregate, water glass, and the like As the coating method, a method for applying the mold coating agent to be used in actual die casting, such as a method for simply applying the die-cast mold coating agent using a hose or a method for applying the die-cast mold coating agent that has been turned into foam, can be used.

Figure 4:
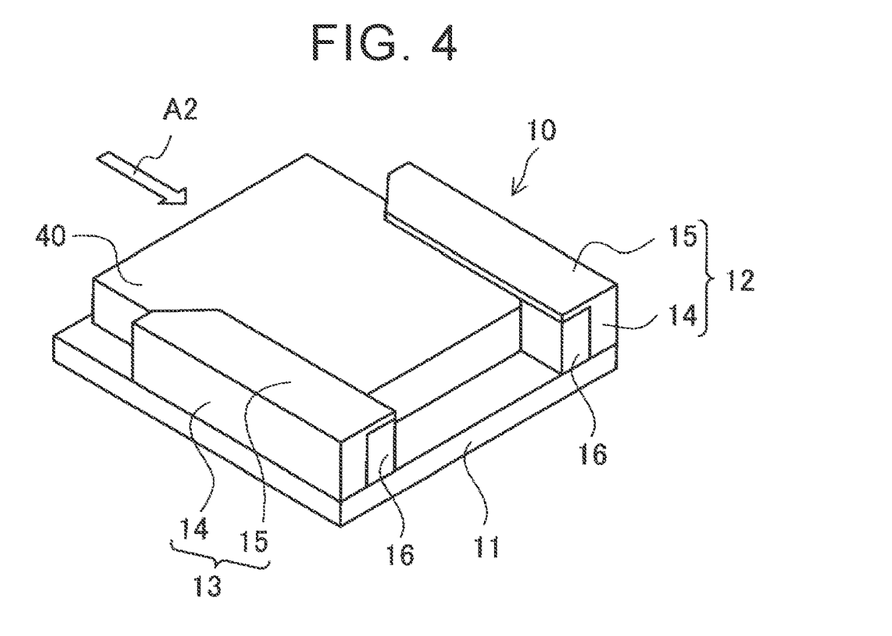
FIG. 4 is a schematic diagram for illustrating each step of the performance test procedure for the mold coating agent.

Next, the plate-shaped block 40 to which the mold coating agent has been applied is set on the base plate 11 of the mold coating agent test device 101 (step S2). FIG. 4 is a diagram schematically illustrating a step of setting the plate-shaped block 40 in each step of the test procedure. As shown in FIG. 4, the plate-shaped block 40 is set between the upper face of the base plate 11 and the lower faces of horizontal portions 15 of the locking portions 12 and 13 provided at the front and rear portions of the base plate 11 such that the plate-shaped block 40 is inserted from the left direction to the right direction in the horizontal direction as shown by an arrow A2. At this time, the plate-shaped block 40 contacts the locking blocks 16 provided at the front and rear end portions of the base plate 11 and is set at a predetermined position.

Figure 5:
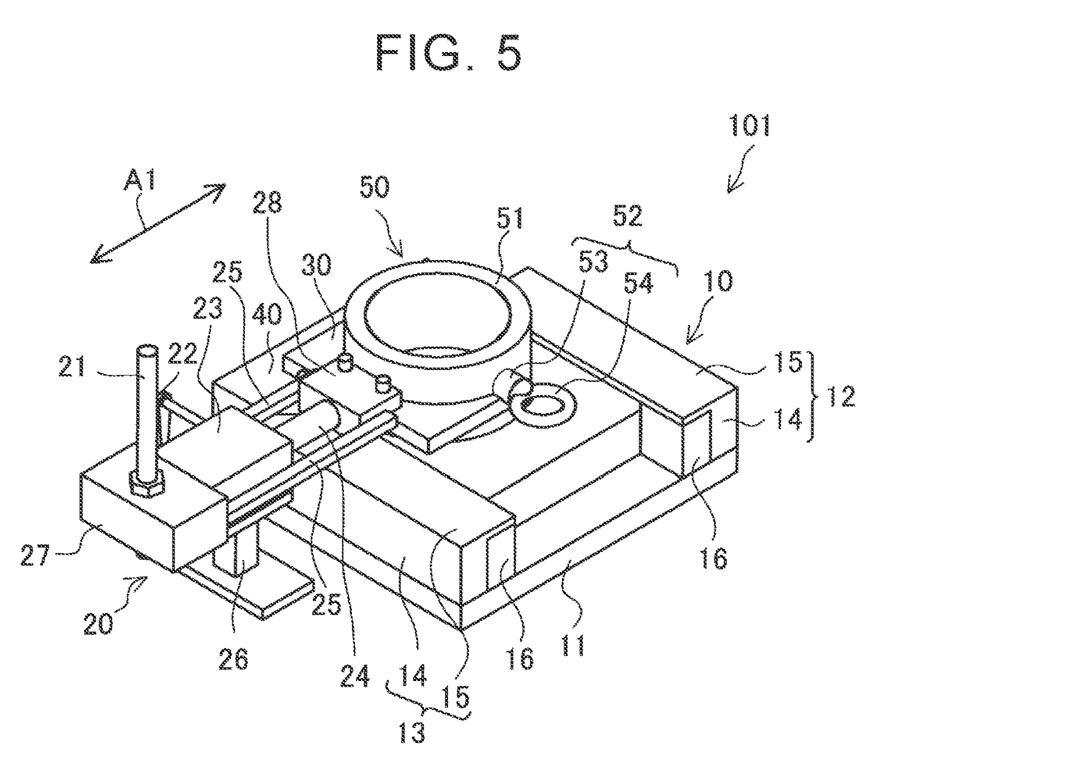
FIG. 5 is a schematic diagram for illustrating each step of the performance test procedure for the mold coating agent.

Next, the tubular block 50 is set on the plate-shaped block 40 (step S3). FIG. 5 is a diagram schematically illustrating a step of setting the tubular block 50 on the plate-shaped block 40 in each step of the test procedure. As shown in FIG. 5, in step S3, the tubular block 50 is placed on the plate-shaped block 40 such that the upper face of the plate-shaped block 40 closes the lower end portion of the tubular block 50. At this time, the tubular block 50 is placed at a predetermined installation position by a positioning function of the positioning member 30. The details of a positioning motion by the mold coating agent test device 101 in step S3 will be described below.

Figure 6:
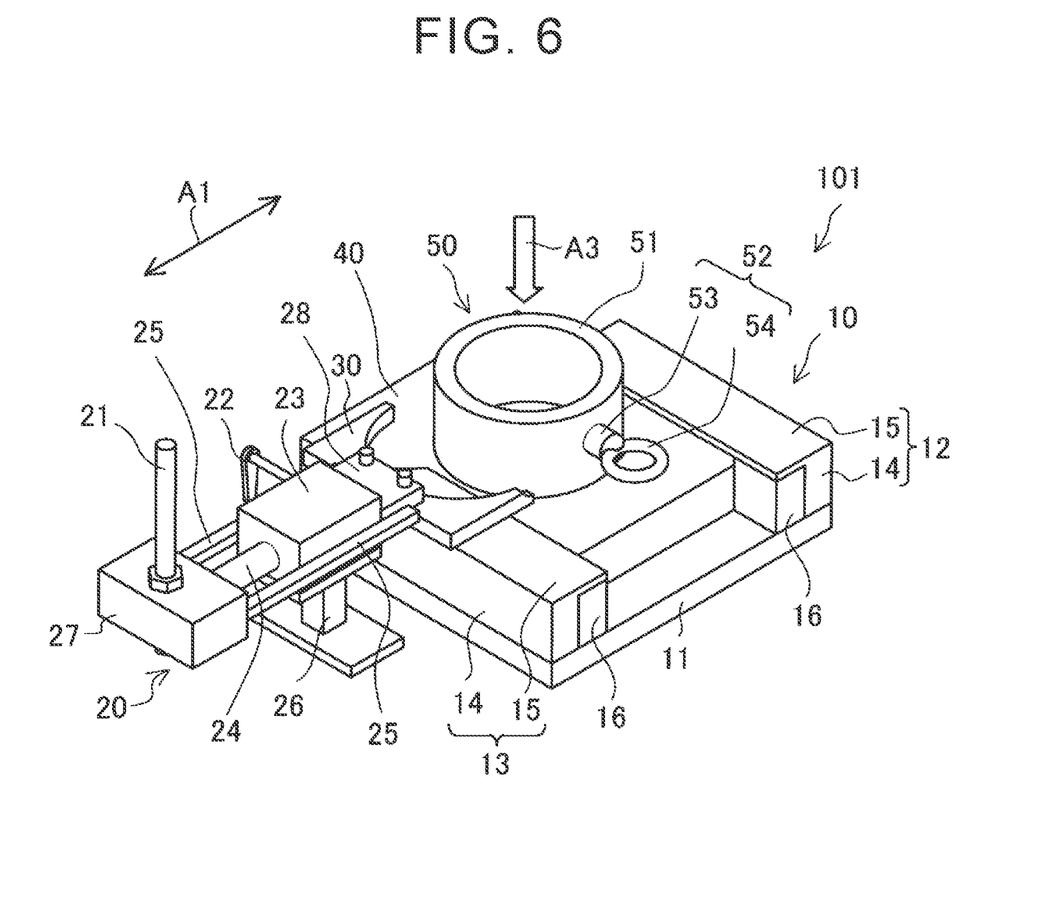
FIG. 6 is a schematic diagram for illustrating each step of the performance test procedure for the mold coating agent.

After the tubular block 50 is placed on the plate-shaped block 40, molten aluminum is poured into the inside of the tubular block 50 (step S4). FIG. 6 is a diagram schematically illustrating a step of pouring molten aluminum in each step of the test procedure. In step S4, as shown in FIG. 6, the molten aluminum is poured into the inside of the tubular block 50 from above as shown by an arrow A3.

Figure 7:
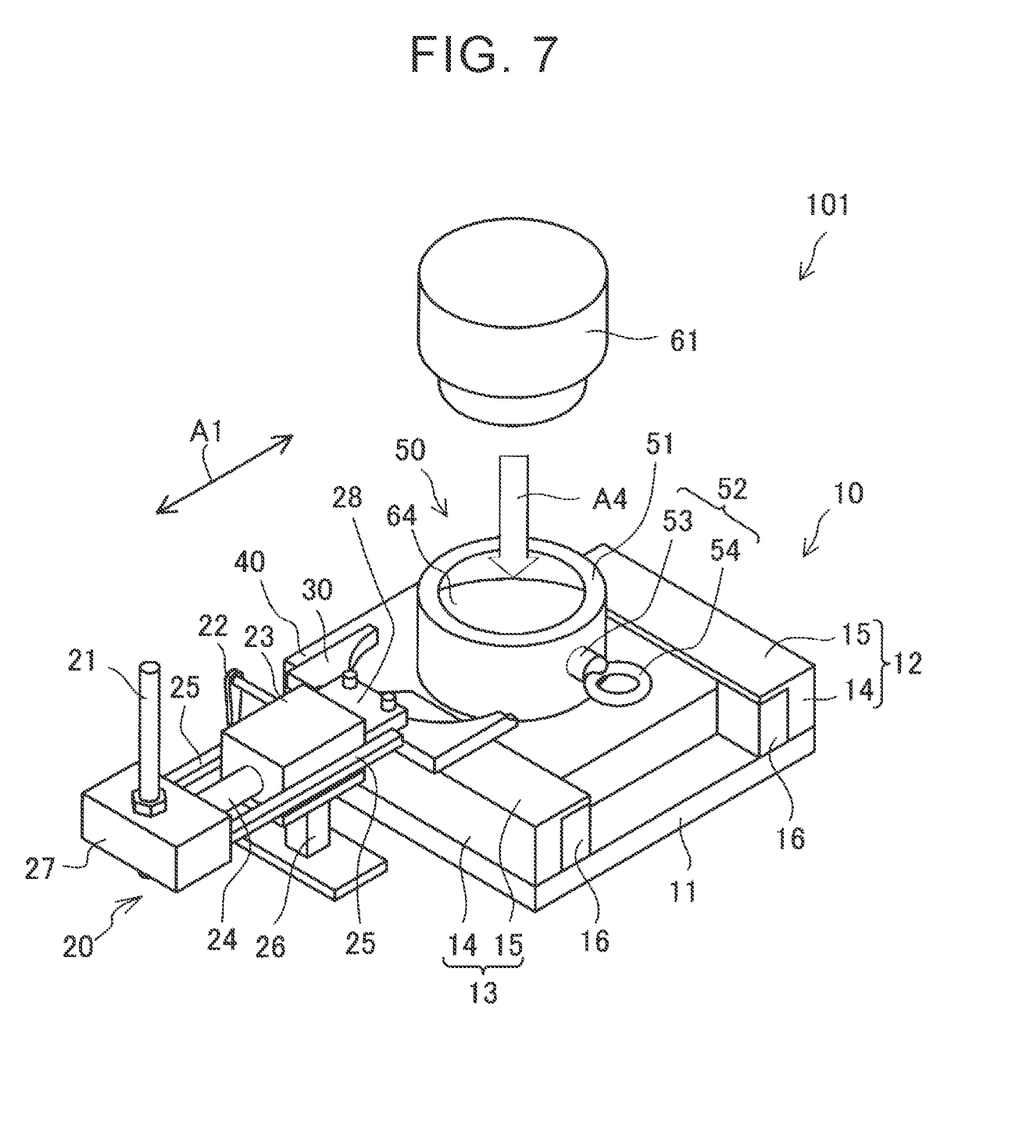
FIG. 7 is a schematic diagram for illustrating each step of the performance test procedure for the mold coating agent.

After the molten aluminum is casted, the molten aluminum is left at room temperature until solidification is confirmed, and is solidified. After the molten aluminum is solidified, a weight 61 is placed (step S5). FIG. 7 is a diagram schematically illustrating a step of placing the weight 61 in each step of the test procedure. In step S5, as shown in FIG. 7, the weight 61 is placed on a solidified aluminum casting 64 and the tubular block 50 from above as shown by an arrow A4.

Figure 8:
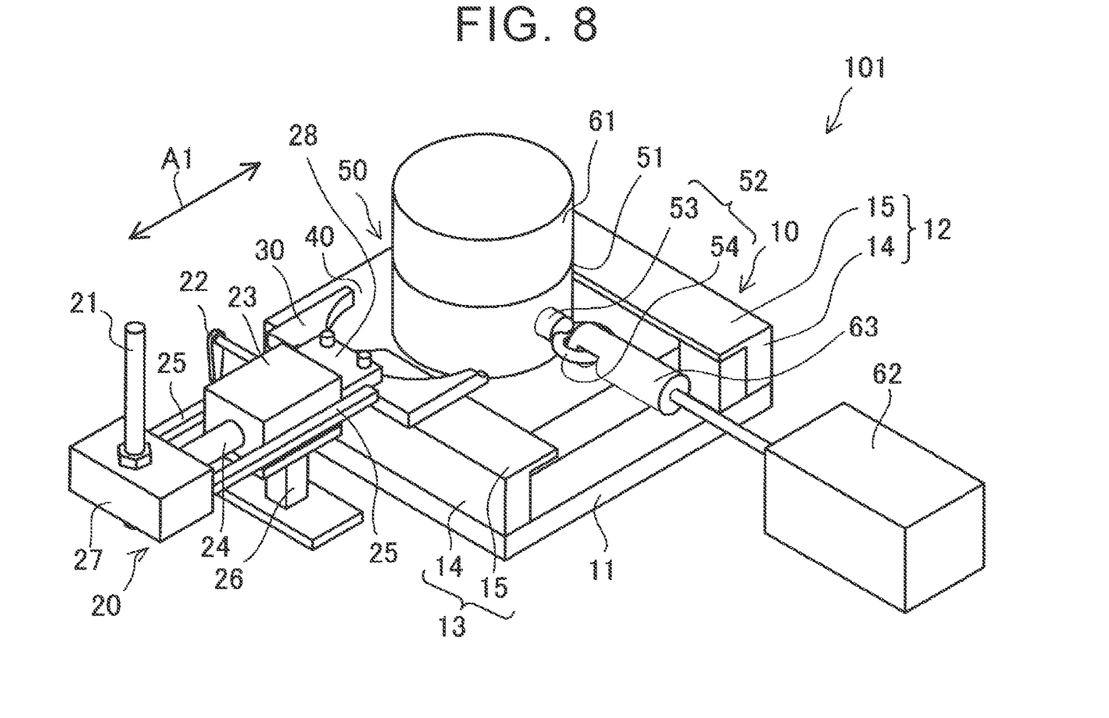
FIG. 8 is a schematic diagram for illustrating each step of the performance test procedure for the mold coating agent.

Next, with the weight 61 placed on the solidified aluminum casting 64 and the tubular block 50, the connecting portion 52 is pulled by the motor 62 (step S6). FIG. 8 is a diagram schematically illustrating a step of pulling the tubular block 50 by the motor 62 in each step of the test procedure. As shown in FIG. 8, the motor 62 is connected to the tubular block 50 from the right direction by hooking the end portion of the connecting member 63 to be connected to the motor 62 into the annular hook portion 54 of the connecting portion 52 from above. The motor 62 corresponds to a "drive unit" that applies a force to the tubular block 50 as a metal mold. The motor 62 applies a pulling force to the right direction to the tubular block 50 via a crank mechanism (not shown). At this time, since the plate-shaped block 40 is fixed by the locking blocks 16 so as not to move in the pulling direction (right direction), the pulling force is applied to the tubular block 50 such that the tubular block 50 slides from the surface of the plate-shaped block 40 to the right direction. Further, since the connecting member 63 is a member having a columnar shape and is not a chain or the like, bending or twisting does not occur at the connecting portion between the motor 62 and the tubular block 50, and the drive force of the motor 62 can be stably transmitted to the tubular block 50.

Figure 9:
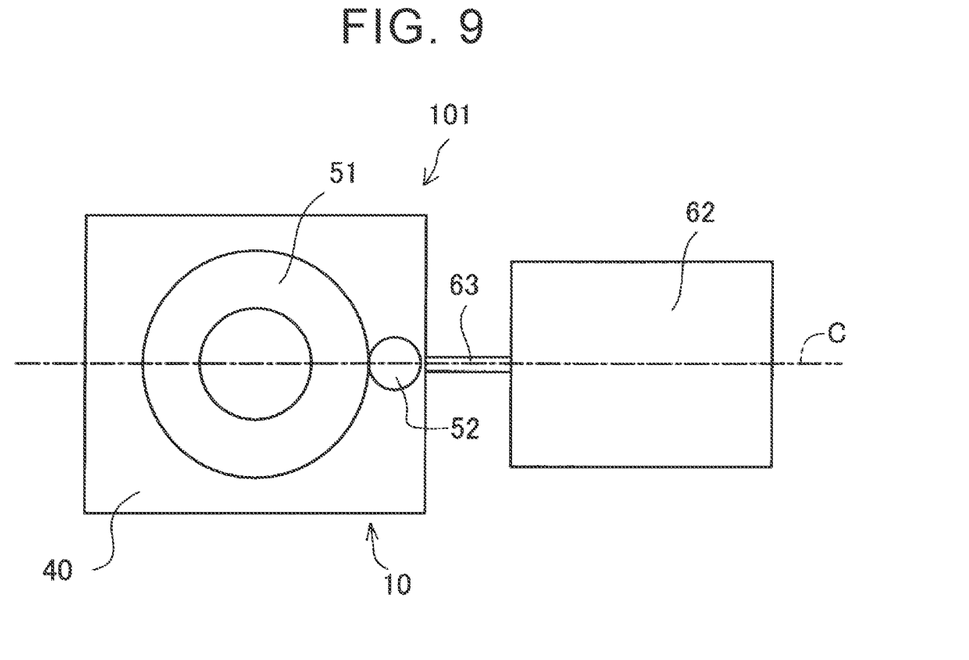
FIG. 9 is a plan view schematically showing a connection state between the mold coating agent test device and a motor.
Figure 10:
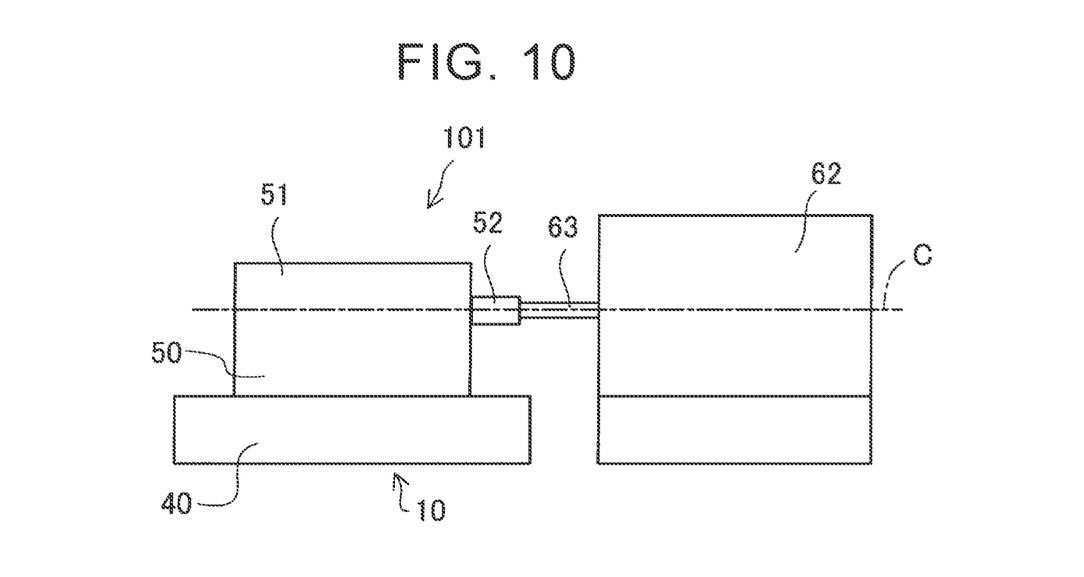
FIG. 10 is a side view schematically showing the connection state between the mold coating agent test device and the motor.

FIG. 9 is a plan view schematically showing a connection state between the mold coating agent test device 101 and the motor 62 in step S6, and FIG. 10 is a side view schematically showing the connection state between the mold coating agent test device 101 and the motor 62 in step S6. As shown in FIG. 9, a virtual line C extending in a direction in which the connecting member 63 extends in the horizontal direction passes through the central axes of the connecting portion 52 and the frame portion 51 in a plan view. That is, the frame portion 51, the connecting portion 52, and the connecting member 63 are arranged such that the virtual line C is aligned without being tilted in a plan view and a side view. In other words, the position of the connecting portion 52 with respect to the motor 62 is adjusted such that the virtual line C is aligned at the time of positioning, and the predetermined installation positions of the connecting portion 52 and the frame portion 51 on the plate-shaped block 40 are adjusted.

FIG. 3 is referenced again. A motion of the tubular block 50 is observed while the tubular block 50 is pulled by driving the motor 62 as described above, and a load when the tubular block 50 and the aluminum casting 64 are moving on the surface of the plate-shaped block 40 is measured (step S7). This load corresponds to the mold release resistance. Then, the tubular block 50 and the aluminum casting 64 are removed from the plate-shaped block 40, and the film thickness of the mold coating agent on the surface of the plate-shaped block 40 is measured (step S8). When the film thickness measured at this time does not change from the initial film thickness after step S1, it can be determined that the mold coating agent is not worn.

Steps S2 to S8 described above are repeated a plurality of times (for example, five times), and finally the performance of the mold release resistance, the ease of wear, and the like is determined based on a plurality of data. The ease of wear to be evaluated by the film thickness can be said to be, in other words, the adhesion of the mold coating agent to the mold or the strength when the mold is repeatedly used.

A3. Positioning Procedure for Tubular Block 50 by Mold Coating Agent Test Device 101

Figure 11:
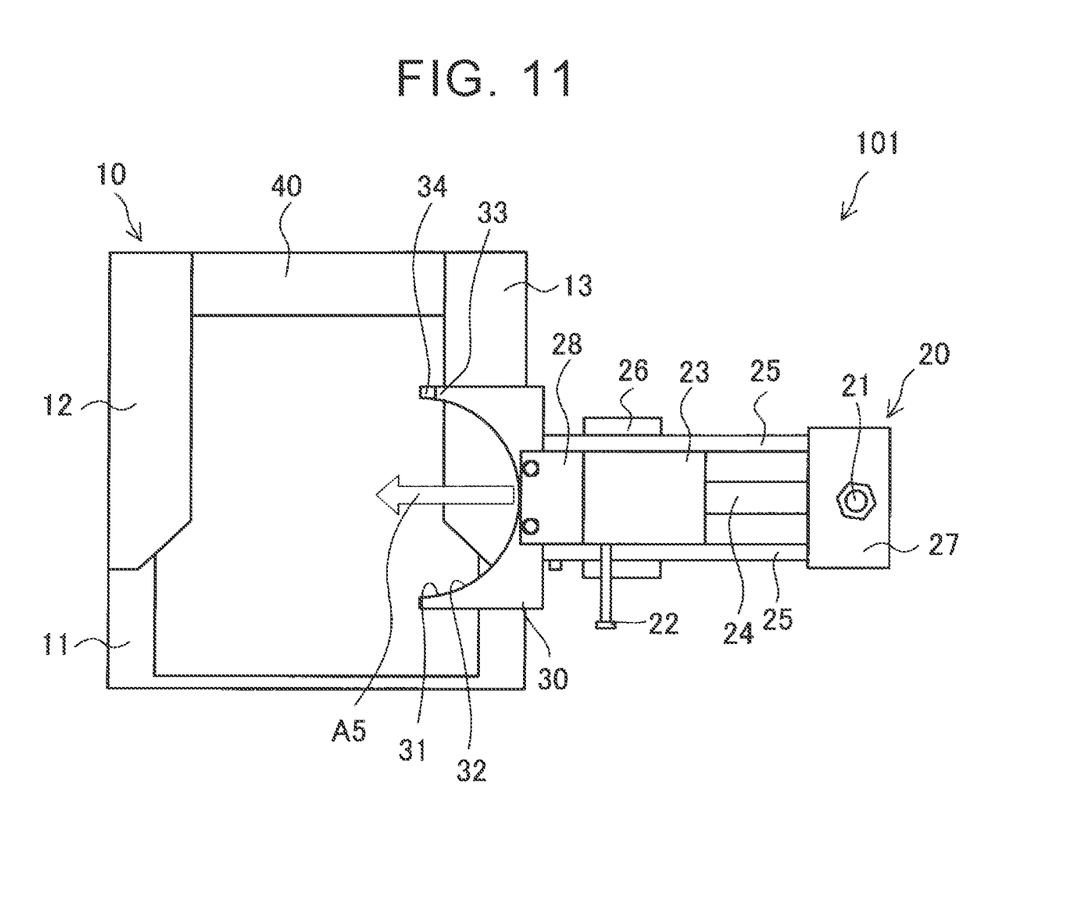
FIG. 11 is a plan view for illustrating each step of a positioning procedure for a tubular block.
Figure 12:
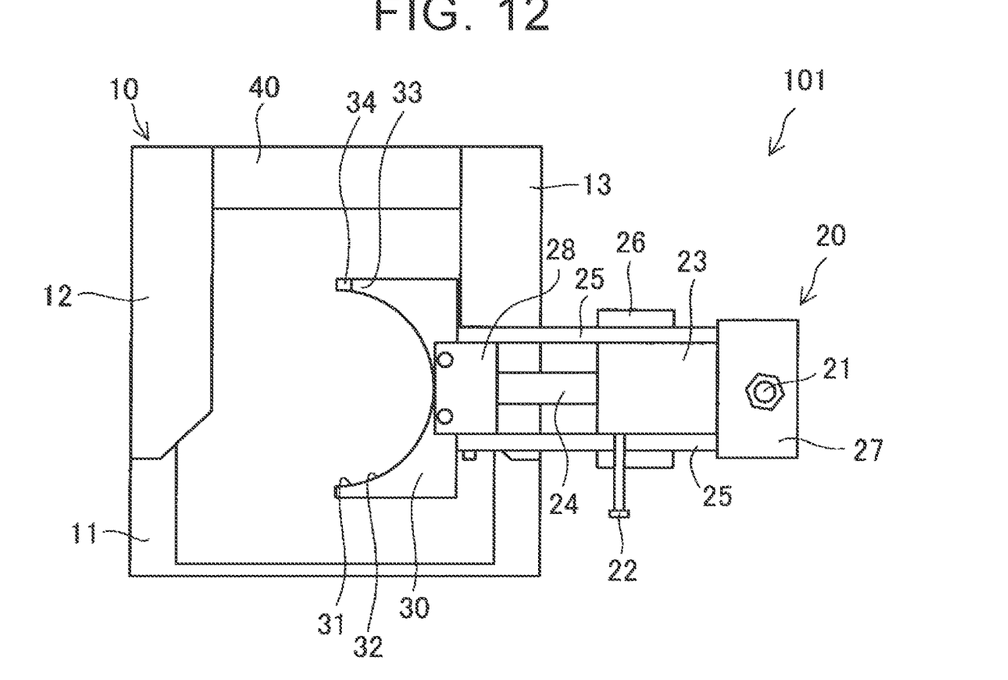
FIG. 12 is a plan view for illustrating each step of the positioning procedure for the tubular block.

Next, the details of the positioning motion by the mold coating agent test device 101 in step S3 for setting the tubular block 50 on the plate-shaped block 40 will be described with reference to FIGS. 11 to 15. FIGS. 11 to 13 and FIG. 15 are each a plan view for illustrating each step of the positioning procedure of the tubular block 50. FIG. 11 shows a state where the positioning member 30 is in the initial position, and corresponds to the figure shown in FIG. 2. FIG. 12 shows a state after the positioning member 30 has advanced to the predetermined installation position, and corresponds to the figure shown in FIG. 1.

When the operator places the tubular block 50 on the plate-shaped block 40, the operator first loosens the lock handle 22 to unlock the positioning member 30 (linear shaft 24). Then, the operator operates the operation handle 21 in the forward direction shown by an arrow A5 in FIG. 11 such that the positioning member 30 is horizontally advanced to the most advanced position via the linear shaft 24, and the state is changed from the state shown in FIG. 11 to the state shown in FIG. 12. When the positioning member 30 reaches the most advanced position, the front face of the connecting member 27 contacts the rear face of the linear bush 23. The position, the size, etc. of each member in the plate-shaped block set unit and the tubular block positioning mechanism unit 20 are set in advance such that the position when the positioning member 30 is moved to the most advanced position coincides with the so called predetermined installation position described above. After the positioning member 30 is advanced to the installation position, the lock handle 22 is tightened to lock the positioning member 30 (linear shaft 24).

Figure 13:
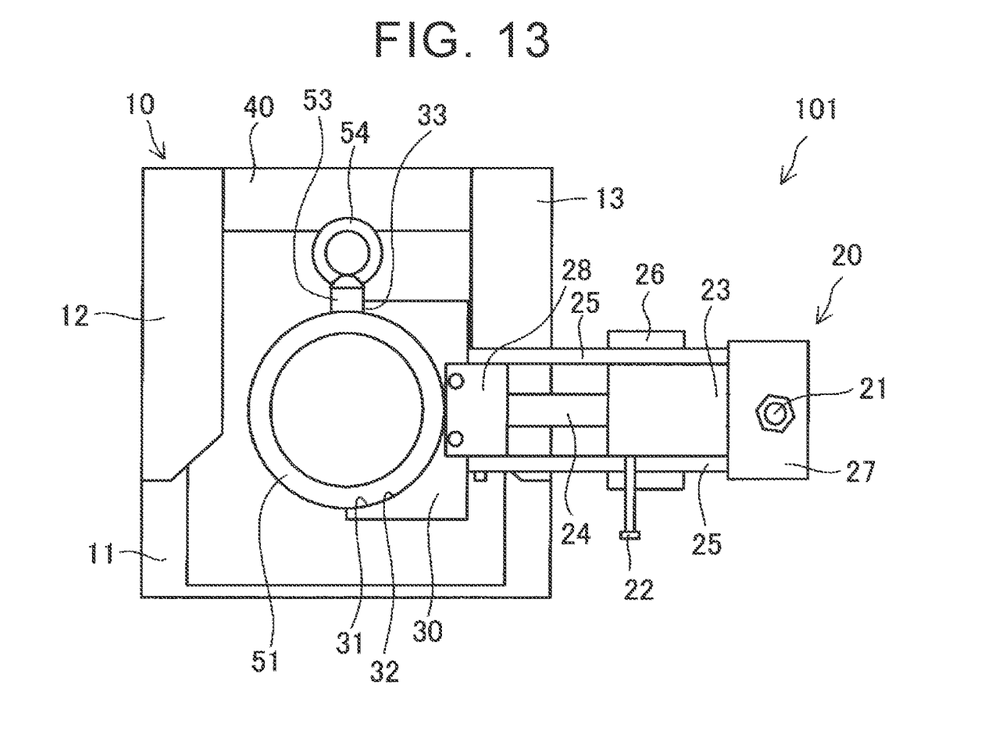
FIG. 13 is a plan view for illustrating each step of the positioning procedure for the tubular block.

FIG. 13 shows a state where the tubular block 50 is positioned by the positioning member 30. As shown in FIG. 13, the operator then places the tubular block 50 on the plate-shaped block 40. At this time, the frame portion 51 of the tubular block 50 is installed so as to extend along the inner peripheral surface 32 of the recess 31 of the positioning member 30.

FIG. 14 is a perspective view schematically showing the periphery of the connecting portion 52 in a state where the tubular block 50 is positioned by the positioning member 30. The tubular block 50 is installed such that the frame portion 51 extends along the inner peripheral surface 32 and the curved surface 34 of the positioning member 30 is in close contact with the side face of the connecting portion 52 (columnar portion 53) from the front side. That is, the tubular block 50 may be installed such that the frame portion 51 is located in the recess 31 of the positioning member 30 and the connecting portion 52 is located on the curved surface 34, and the operator can place the tubular block 50 while visually confirming the installation position of the entire tubular block 50. Therefore, the tubular block 50 can be easily installed such that the frame portion 51 and the connecting portion 52 are installed at the desired positions.

Figure 15:
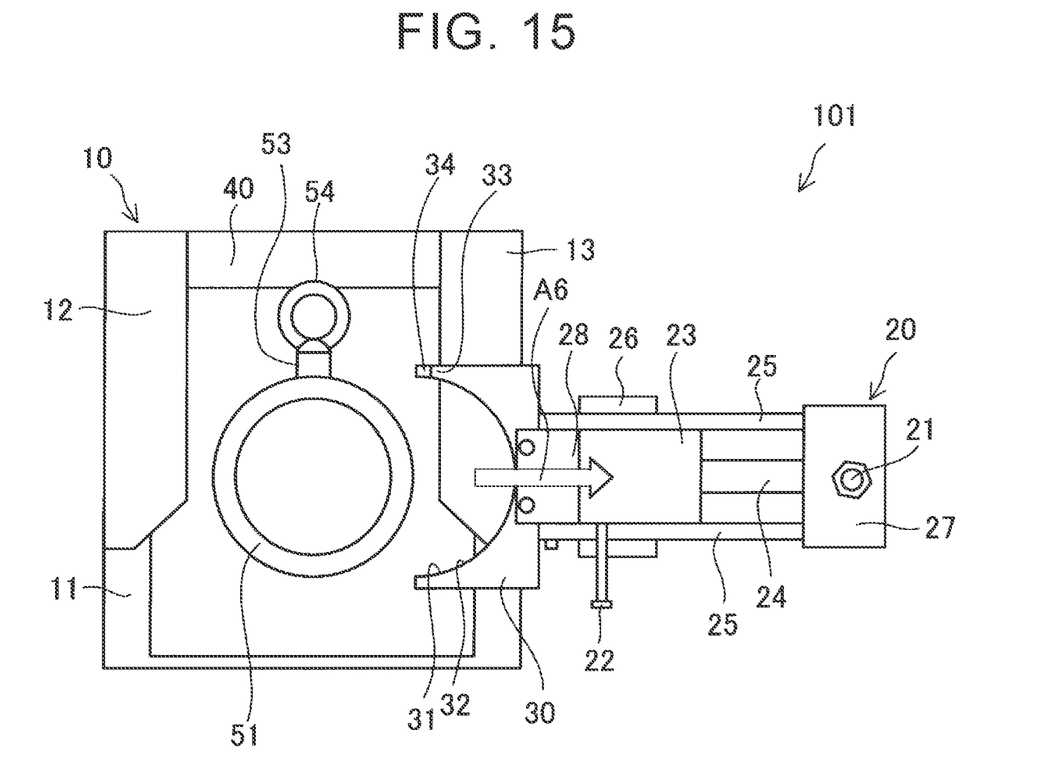
FIG. 15 is a plan view for illustrating each step of the positioning procedure for the tubular block.

After that, the operator loosens the lock handle 22 again to unlock the positioning member 30 (linear shaft 24). FIG. 15 is a diagram showing a state where the positioning member 30 is retracted after the tubular block 50 is placed. Then, the operator operates the operation handle 21 in the rearward direction shown by an arrow A6 in FIG. 15 such that the positioning member 30 is horizontally retracted to the initial position via the linear shaft 24, and the state is changed from the state shown in FIG. 13 to the state shown in FIG. 15. Even when the positioning member 30 is retracted, the tubular block 50 is maintained at the position positioned by its own weight.

(1) The mold coating agent test device 101 according to the above embodiment includes the frame of the positioning portion of the positioning member 30 and the connection positioning portion of the positioning member 30, and the mold coating agent test device 101 according to the above embodiment can set the entire tubular block 50 such that the frame portion 51 and the connecting portion 52 are at the predetermined installation positions on the plate-shaped block 40.

As a result, as shown in FIG. 9, the virtual line C extending in the direction in which the connecting member 63 extends in the horizontal direction passes through the central axes of the connecting portion 52 and the frame portion 51 in a plan view. For example, when the connecting portion 52 deviates from the virtual line C in a plan view, an unintended moment may be generated when the connecting portion 52 is pulled, and a correct measurement result may not be obtained. However, in the first embodiment, when the pulling force or the pushing force is applied to the tubular block 50, the position and the direction where the force is applied can be set to be accurate and constant so as to be the predetermined position and direction without depending on the skill level of the operator, so that an unintended moment is not generated. In particular, when the evaluation is performed by repeating the tests, the possibility of an error in each measurement is reduced, so that the evaluation accuracy can be improved.

(2) With the mold coating agent test device 101 according to the above embodiment, the positioning member 30 integrally includes the functions of both the frame positioning portion and the connection positioning portion. Therefore, the device configuration can be simplified and the device can be downsized.

(3) With the mold coating agent test device 101 according to the above embodiment, the positioning member 30 can move in the horizontal direction with respect to the plate-shaped block 40 set in the plate-shaped block set unit 10. Therefore, after the tubular block 50 is positioned and disposed on the plate-shaped block 40, the positioning member 30 can be moved away from the plate-shaped block set unit 10. Therefore, when the force is applied to the tubular block 50, it is possible to reduce a possibility that the positioning member 30 interferes with the motor 62 and the connecting member 63, and to improve workability.

(4) The mold coating agent test device 101 according to the above embodiment includes locking portions 12 and 13 at the front and rear end portions of the base plate 11, and the upward movement of the plate-shaped block 40, which is the movement on the tubular block 50 side, is restricted. Therefore, when the force is applied to the tubular block 50, for example, it is possible to reduce a possibility that the tubular block 50 keeps adhering to the plate-shaped block 40 due to a large mold release resistance and the plate-shaped block 40 lifts upwards.

B. Other Embodiments (B1) With the mold coating agent test device 101 according to the first embodiment, the recess 31 having a semicircular shape is provided at the front end of the positioning member 30. However, as long as the inner peripheral surface 32 of the recess 31 positions the frame portion 51 by contacting at least a part of the outer peripheral surface of the tubular block 50 from the outside, the recess 31 may not have a semicircular shape. For example, the recess 31 may have a quarter circular shape or a shape divided into a plurality of arcs.

(B2) In the first embodiment, the tubular block 50 that is a cylindrical body is illustrated as the metal mold, but the tubular block 50 is not limited to the cylindrical body, and may be a square tubular body. The first embodiment can be implemented by adopting the shape of the positioning member 30 as a shape appropriately corresponding to the shape of the outer peripheral surface of the tubular block 50.

(B3) With the mold coating agent test device 101 according to the first embodiment, the positioning member 30 is installed in a direction in which a plate-shaped flat surface extends in the horizontal direction. That is, the tubular block 50 is sandwiched from the horizontal direction, but for example, the outer peripheral surface of the tubular block 50 may be sandwiched from above the tubular block 50.

(B4) In the first embodiment described above, the pulling force is applied to the tubular block 50, but the pushing force may be applied to the tubular block 50.

(B5) The mold coating agent test device 101 according to the first embodiment includes the positioning member 30 including the frame positioning portion and the connection positioning portion integrally, but a member having a function of the frame positioning portion and a member having a function of the connection positioning portion as a different body from the member having the function of the frame positioning portion may be provided.

The present disclosure is not limited to each of the above embodiments, and can be realized by various configurations without departing from the spirit thereof. For example, the technical features in each embodiment corresponding to the technical features in each aspect described in the column of SUMMARY can be appropriately replaced or combined in order to solve some or all of the above-mentioned issues or achieve some or all of the above-described effects. Further, when the technical features are not described as essential in the present specification, these can be deleted as appropriate.

What is claimed is:

1. A mold coating agent test device in which a performance of a mold coating agent is tested by applying the mold coating agent to a surface of a metal block, placing a metal mold having a tubular shape on the metal block such that the metal block closes one end portion of the metal mold, and applying a pulling force or a pushing force to the metal mold such that the metal mold is separated from the metal block after a molten metal is poured into the metal mold and solidified, the mold coating agent test device comprising:

a frame positioning portion that positions a frame portion of the metal mold such that the frame portion is positioned at a predetermined position when the metal mold is placed on the metal block; and     a connection positioning portion that positions a connecting portion such that the connecting portion that is a portion provided in the frame portion and to which a drive unit that applies the force is connected is positioned at a predetermined position when the metal mold is placed on the metal block,     wherein the frame positioning portion includes a frame contact portion that is in contact with a curved part of an entire circumference of an outer peripheral surface of the frame portion from an outside of the frame portion and that has a shape that extends along a shape of the frame portion.

2. The mold coating agent test device according to claim 1, wherein:

the connecting portion is provided so as to project from an outer peripheral surface of the frame portion; and     the connection positioning portion includes a connection contact portion that extends along a shape of the connecting portion and restricts a relative rotation of the frame portion with respect to the metal block with the connection contact portion contacting the connecting portion.

3. The mold coating agent test device according to claim 1, wherein the frame positioning portion and the connection positioning portion are included in a mold positioning member.

4. The mold coating agent test device according to claim 3, further comprising a movement mechanism unit that allows the mold positioning member to move in a horizontal direction with respect to the metal block.

5. The mold coating agent test device according to claim 1, further comprising a movement restricting unit that faces the surface of the metal block and restricts movement of the metal block toward the metal mold.

6. The mold coating agent test device according to claim 5, wherein the movement restricting unit is composed of an upright portion and a horizontal portion each having a plate shape, and has an L-shape in a side view.

* * * * *